United States Patent [19]

Epstein

[11] Patent Number: 4,695,138
[45] Date of Patent: Sep. 22, 1987

[54] PANORAMIC REAR VIEW AUTOMOBILE MIRROR

[76] Inventor: David Epstein, 54 Turning Mill Rd., Lexington, Mass. 02173

[21] Appl. No.: 934,948

[22] Filed: Nov. 26, 1986

[51] Int. Cl.[4] .......................... B60R 1/04; B60R 1/08; G02B 5/10; G02B 7/18
[52] U.S. Cl. .................................... 350/615; 350/626; 350/629; 350/636; 350/639
[58] Field of Search ............... 350/615, 627, 626, 625, 350/629, 639, 636, 616; 248/480, 484, 487

[56] References Cited

U.S. PATENT DOCUMENTS

| | | | |
|---|---|---|---|
| 1,518,956 | 12/1924 | Beitman | 248/480 |
| 2,605,676 | 8/1952 | Couch | 350/615 |
| 2,649,028 | 8/1953 | Lenta | 350/615 |
| 3,764,201 | 10/1973 | Haile | 350/625 |
| 4,258,979 | 3/1981 | Mahin | 350/625 |
| 4,331,382 | 5/1982 | Graff | 350/627 |
| 4,449,786 | 5/1984 | McCord | 350/625 |

FOREIGN PATENT DOCUMENTS

| | | | |
|---|---|---|---|
| 1324522 | 3/1963 | France | 350/615 |
| 2311688 | 12/1976 | France | 350/626 |
| 1569136 | 6/1980 | United Kingdom | 350/626 |

Primary Examiner—Jon W. Henry
Attorney, Agent, or Firm—Richard P. Crowley

[57] ABSTRACT

A rear view mirror for mounting on the windshield of a motor vehicle which mirror provides a one position, relatively continuous, panoramic rear view without significant distortion of distance perspective, which mirror comprises a central flat surface mirror and two side or wing mirrors having a flat surface but a convexly curved surface toward the exterior peripheral horizontal edge area thereof and vertically hinged in line with the vertical plane of the central mirror on the interior edge to provide a substantially continuous reflecting rear view, the side or wing mirrors adjustably hinged at the rear and an extension lever to provide for the horizontal adjustment of the mirrors about a horizontal axis, the mirror and the motor vehicle having a windshield which includes the rear view panoramic mirror.

10 Claims, 4 Drawing Figures

U.S. Patent  Sep. 22, 1987  4,695,138
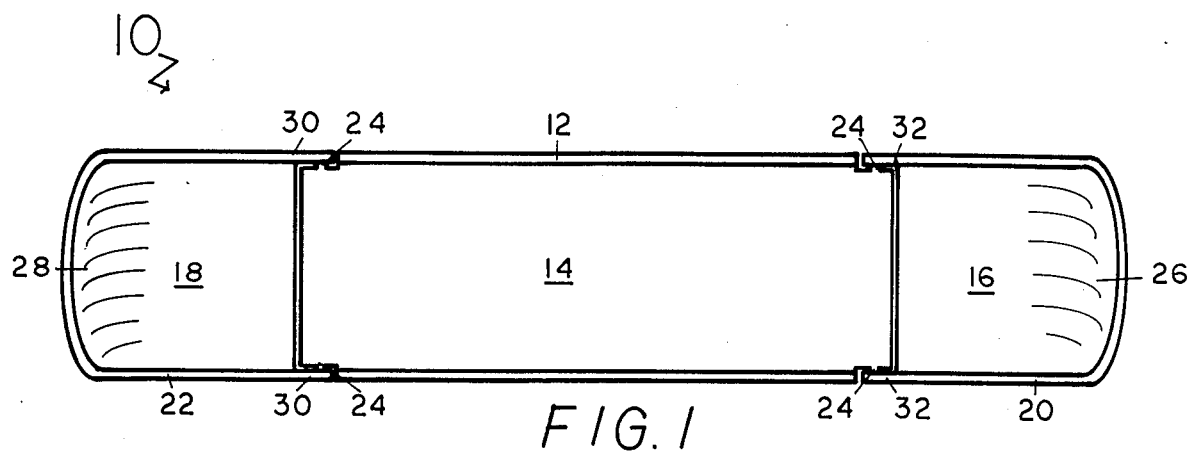
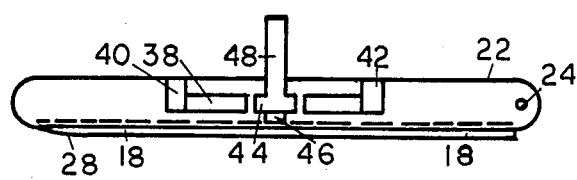
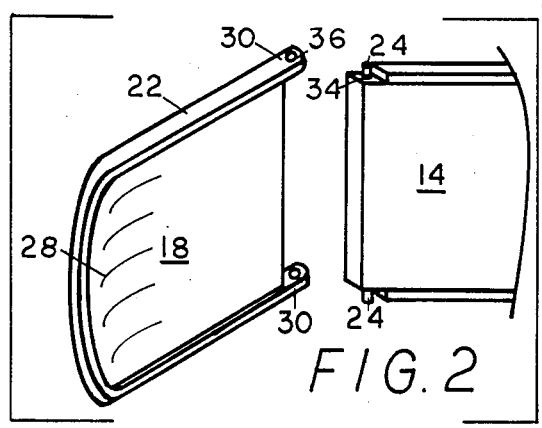
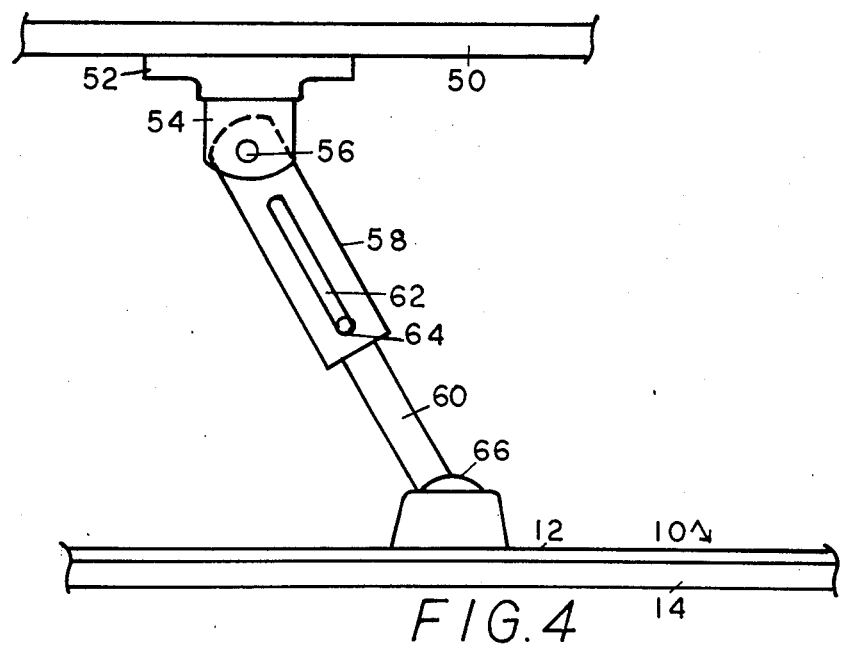

PANORAMIC REAR VIEW AUTOMOBILE MIRROR

BACKGROUND OF THE INVENTION

There are a wide variety of automotive rear view mirrors proposed and in use. However, to date, no automotive rear view mirror has substantially satisfied all of the requirements of a rear view mirror. Desirable and required features of a automotive rear view mirror would include a panoramic, relatively continuous rear view which eliminates the blind spots on the left and right sides and further provides for an undistorted distance perspective, especially in the area behind the car. Optionally, also the rear view mirror should be of a non-glare type and provide a single position, rear view mirror that shows the total rear view of a highway while keeping the front view within peripheral vision and yet not block the automotive sun visors when placed in their down positions.

A number of presently commercially available rear view mirrors contain some but not all of the desirable features of automotive rear view mirrors. Some panoramic rear view mirrors are too wide and so block the sun visors in the down position and also by their convex surfaces provide distance distortion in the rear view in that rear objects seem further behind than they actually are. Further, such mirrors often are not sufficient to eliminate fully both left and right blind spots. Extra wide, full view, panoramic rear mirrors are excessively wide and tend to block the sun visors in the down position. Some mirrors cover only the blind spot on the left side and by their convex surfaces create distance distortion. Right angle, dash-type mirrors are unsatisfactory in that the sight lines from the dashboard position are too low to give the best rear view perspective and often such mirrors are too narrow, and the convex curve is inadequate to cover both the right and left side spots. Thus, these mirrors tend to be non-panoramic though their convex curves distort distance perspective. Twin view mirrors, typically comprised of small, convex mirrors do not provide a panoramic view nor cover right and left side blind spots, and their convex surfaces distort distance perspective.

Other proposed panoramic rear view mirrors provide for a center mirror panel to provide normal and adequate rear view of the usual standard mirror with side panels, or wings, which are wide angled and are fixed to the central mirror. Thus, this type of mirror does not cover right and left side blind spots adequately, and by its convex, wide-angled surfaces distorts distance perspective. Other proposed rear view mirrors provide mirrors which are too small. Position and placement of mirrors above the regular rear view mirror provides for adjustment of the separate side mirrors through a ball and socket joint. Such a mirror is non-panoramic, provides image distortion and blocks the sun visors in the down position.

Rear view mirrors have been described in a number of U.S. patents to include U.S. Pat. No. 2,214,639 which includes a flat surface central mirror with flat surface and a ball and socket universal joint for adjustable wing mirrors. U.S. Pat. No. 2,605,676 discloses a rear view mirror assembly which includes a central section and two wing sections, the wing sections containing convex reflecting elements. U.S. Pat. No. 2,802,394 relates to auxiliary reflectors, which have three sections, and employ hinges between the wing sections and the central mirror section. U.S. Pat. No. 2,869,425 discloses a rear view mirror for an automotive vehicle with a mirror-receiving chamber which is wide in the central portion and narrows in the end portion within mirror sections, the rear view mirror being adjustable within the casing. The wing mirrors are flat mirror surfaces and thus limited in their lateral scope of view. U.S. Pat. No. 4,575,202 concerns a rear view mirror for automotive vehicles directed to eliminating the blind spots to the left rear and the right rear with a single, continuous mirror having a center portion and a left and right wing portion toward the ends thereof to provide a panoramic rear view; however, its convex mirror surfaces create distance distortion.

Thus, while there are a variety of proposed rear view mirrors, it is desirable to provide a rear view mirror which is truly panoramic without substantial distance distortion, which eliminates the blind spots, and is easily constructed and easily adjustable.

SUMMARY OF THE INVENTION

This invention relates to a rear view mirror and to vehicles containing the rear view mirror and to the use and operation of the mirror. In particular, the invention concerns a panoramic rear view mirror which provides a relatively continuous, panoramic rear view and without substantial distortion of distance perspective.

It is an object of the present invention to provide a unique, panoramic rear view mirror that provides for a panoramic rear view of the highway without distortion of the distance perspective and which rear view mirror also eliminates the blind spots on the left and right sides of the car. Another object of the invention to provide a rear view mirror which, by its single position, gives the total rear view of the highway while keeping the front view within peripheral vision. A further object of the invention is to provide a one position, easily adjustable rear view mirror with total rear and side views whose positioning eliminates the blocking of sun visors when placed in their down positions.

The panoramic rear view mirror comprises a reflecting center mirror with a conventional flat surface. This is not a wide-angle mirror, therefore it gives a view of the rear highway which is undistorted with respect to distance perspective. The mirror includes side or wing mirrors closely hinged on either side of the center mirror that provide a wide perspective of the side portions of the highway behind and beside the car. The side or wing mirrors are vertically hinged so that the hinge pins are in line with the vertical plane of the flat center portion of the center mirror and are closely positioned towards the edge of the central mirror. Consequently, the side or wing mirrors, when turned outward for wide-perspective viewing, do not separate far from the center mirror so that the panoramic view is therefore almost continuous, but the small separation between the center and the side or wing mirrors, for example, abou one millimeter, is enough of a separation to indicate to the driver in use that a different view is found in the wing or side mirrors.

In the rear view mirror, each wing or side mirror is typically housed in a casing, such as a black plastic casing, with the side or wing mirror floating free of the vertical hinge connecting the casing to the center mirror panel. The side or wing mirrors are hinged to the side or wing casings through a horizontal hinge arrangement, while extending behind the casing is an adjustment means, such as a lever, which permits the driver to adjust vertically the side or wing mirror face. The panoramic rear view mirror thus provides for an universal hinge as a result of the vertical hinge of the wing casing and the horizontal hinge between the wing mirror and the wing casing therefore permitting infinite adjustment separately of both side or wing mirrors, horizontally and vertically, to accommodate sight lines in different automobiles.

In addition and importantly, the side or wing mirrors are not conventional wide angle mirror material. Conventional wide angle mirrors have fully convexed surfaces, and as a result, these mirrors distort distance and size perspective for all possible angles, which is dangerous for a driver as it makes cars and other objects seen in the conventional, wide angle mirrors appear to be closer than the objects actually are. Thus, these mirrors typically carry a warning to this effect. The side or wing mirrors of the panoramic mirror have a different reflecting mirror face surface. The inside surface portion extending from the interior and vertical hinge outwardly toward the exterior is a conventional flat and non-distance distorting surface face mirror. The outward portion of the mirror toward the exterior peripheral edge is gently and gradually curved providing a wide angle view of the side portion of the car's blind spot. The small area of convex curvature of the outer edge, e.g. about three-quarters to one inch with a mirror width of two to three inches, and the gentle curve of the convexity, e.g. 10° to 30°, over surface minimizes distance distortion. While this slight edge portion somewhat distorts distance prspective, it occupies but a small part of the total mirror face and only toward the exterior edge, for example, toward the exterior outer half or less edge. Therefore, a significant portion of the rear view perspective of the side or wing mirror is undistorted with respect to distance, while the wide angle portion of the mirror is sufficient to reveal the presence of a car in the forward area of the blind spot.

The panoramic rear view mirror of the invention is mounted to the windshield of an automobile in a manner so that the mirror's position is far forward, that is, a close as possible to the windshield. The positioning close to the windshield provides the widest rear view perspective, and it allows the sun visors to be placed in their down positions without hitting the mirror. Since different automobiles have different rear view sight lines, the rear view mirror of the invention is mounted to be integrally positioned with respect to height and lateral placement. The rear view mirror includes a telescopic-type arm between the windshield mount and mirror and is hingedly connected on the windshield mount such that it can rotate typically 360° on the windshield mounting base which further allows the arm an 180° rotation of the telescoping arm on its base. Typically, the rear view panoramic mirror is positioned at the top of the windshield on the center line of the car since this position provides the best side view in the wing or side mirrors, partially bypassing the driver's head on the left wing mirror to allow the fullest view of the left side blind spot.

Thus, the panoramic rear view mirror provides for a universal adjustment about horizontal and vertical axes, a unique side view mirror reflecting surface which minimizes distance distortion perspective, an easily adjustable mounting arm or means and easily bidirectional, infinite positioning of the mirror on the windshield providing a rear view panoramic mirror which has a substantially continuous, broad rear view.

The rear view panoramic mirror of the invention will be described for the purposes of illustration only in connection with a specific embodiment; however, it is recognized that minor changes, modifications, additions and improvements may be made by those persons skilled in the art without departing from the spirit and scope of the invention as described and claimed.

BRIEF DESCRIPTION OF THE DRAWINGS

FIG. 1 is a front plan view of the panoramic rear view mirror of the invention;

FIG. 2 is a partially exploded schematic, fragmentary view of one wing portion of the rear view mirror of the invention;

FIG. 3 is a top plan partially sectional view of one section of the side or wing mirror of the panoramic mirror of the invention; and FIG. 4 is a fragmentary view of the panoramic rear view mirror secured to an automotive windshield.

DESCRIPTION OF THE EMBODIMENTS

FIG. 1 is a front plan view of a panoramic rear view mirror 10 composed of a black plastic center frame 12 housing center mirror having a flat reflecting surface 14 which mirror 10 includes side or wing mirrors 16 and 18 and black plastic side frames 20 and 22. The side frames 20 and 22 are secured to the edge of the central mirror 14 through the use of top and bottom hinge pins 24 (see FIG. 2 for details) which extend through vertical side hinge leaves 30 and 32 and through hinge leaf casing pinholes 36 in the mirror edge 14. The hinge pins 24 may be integrally molded and hence part of the mirror edge 14.

As illustrated, the interior edge of the side mirror 18 shown in FIG. 2 (with the other side mirror 16 being the same) is placed in a close position with the edge of the mirror 14 for a distance of about one millimeter with the hinges vertically in line with the vertical plane of the central mirror 14 to provide for a minimum discontinuity of the image of the rear view mirror. The hinge pin 24 on the top and bottom extends through the thickness of the extending hinge casing, or leaf, 30 to the hole 36. The wing mirrors 16 and 18 are composed of a flat surface extending from the interior edge outwardly to the exterior peripheral edge 26 and 28 respectively which provides for a gentle or gradual curvature as illustrated by the shaded area in FIGS. 1 and 2.

FIG. 3 is a top plan, partially sectional view of one of the side or wing view mirrors 18 illustrating the horizontal axis hinge adjustment which is the same for both left and right sides wherein a horizontal axis hinge 38 is provided with the left side 40 and the right side 42 mounted to the rear face of the side or wing view 16 or 18 mirror casings 20 and 22 with the center arm of the hinge 44 bonded by bond 46 to the center rear of the side mirror 18 with an adjustable lever arm 48 extending therefrom so as to permit movement of the mirror 18 about an horizontal axis for the movement of the outwardly extending adjustment lever 48 by the driver. FIG. 3 also illustrates the convexly curved outer edge 28 of the mirror 18 and illustrates the flat surface of the mirror over a substantial portion of the side or wing view mirror.

FIG. 4 is a top plan view of the panoramic rear view mirror 10 secured in position to an automotive windshield 50 through the employment of a windshield mount 52, a windshield base 54 having two projecting leaves secured by a screw-type hinge pin 56 which extends through both base mount leaves and which secures base 54 to the telescoping arm 58 which fits between the base mount leaves, the base permitting 360° rotation about the windshield mount 52. The hinge pin 56 secures windshield base 54 to the telescoping arm 58. The base 54 fits inside the mount 52 with an internal flange which allows base 54 a 360° rotation within mount 52. The windshield mount also includes a telescoping arm 58 and an extension arm 60 providing telescoping through a slot 62 and an adjustable tightening screw 64, the one end of the arm 60 secured through a ball and socket joint 66 which is secured generally to the back central surface of the rear view panoramic mirror 10. The telescoping arm assembly illustrated allows and maintains changes in the rear view mirror assembly and permits the correct distance of the mirror from the mounting point on the windshield 50 and for a 360° rotation about the base mount and 180° rotation of arm 58, while the ball and socket joint 66 permits the driver to allow and maintain the changes in the mirror position and orientation in use.

Thus, in use, the panoramic rear view mirror 10 may be secured to the windshield of an automobile vehicle, may be easily adjusted and provides for a panoramic rear view and universal adjustment about a vertical and horizontal axis of the side or wing view mirrors, the side or wing view mirrors are so curved only at the exterior edges so as to provide for little, if any, distance distortion perspective, while the side and rear view mirrors are mounted closely adjacent to the vertical hinge to the center flat surface mirror to provide for a substantially continuous, panoramic view. The rear view mirror thus provides for a unique combination of features that overcomes many of the disadvantages of prior art rear view mirrors.

What is claimed is:

1. A panoramic rear-view mirror adapted to be mounted on the windshield of a motor vehicle, which mirror provides a one position, relatively continuous, panoramic rear view without distortion of distance perspective, while at the same time keeping the forward view of the highway within peripheral vision, which mirror comprises in combination:
   (a) mirror housing means which comprises a first and a second wing mirror casing;
   (b) a flat reflecting surface mirror centered between the first and second side mirror casings;
   (c) a first reflecting mirror disposed in the first wing casing and a second reflecting mirror disposed in the second wing casing, the first and second mirrors in the same vertical plane as the center mirror, and the adjacent mirror edges closely adjacent to the respective edges of the central mirror to provide a substantially continuous reflecting mirror view;
   (d) the first and second mirrors having a flat surface reflecting area and a convexly curved mirror surface area at the exterior peripheral edge, the flat surface occupying a substantial area portion of said mirror to provide minimal distortion of distance perspective;
   (e) first adjustment means to secure the first and second casings to the central mirror and to move the first and second casings about a vertical axis with respect to the central mirror;
   (f) second adjustment means to move the first and second mirrors within the respective casings about a horizontal axis within the respective casings; and
   (g) means to connect at a defined distance the central mirror to the motor vehicle.

2. The mirror of claim 1 wherein the means to secure the first and second casings to the central mirror comprises top and bottom strong friction hinge pins secured through the first and second casings to the top and bottom, respectively, of the mirror.

3. The mirror of claim 1 wherein the means to move the first and second mirrors comprises a strong friction hinge secured to the back of the first and second mirrors and an extension lever to permit manual movement of the first and second mirrors about the horizontal hinge axis.

4. The mirror of claim 1 wherein the peripheral convexly curved area extends a distance of about one inch, or less, from the flat surface central area to the exterior mirror edge.

5. The mirror of claim 1 wherein the maximum separation between the edge of the wing mirrors and the center mirror is about one millimeter or less.

6. The mirror of claim 1 wherein the means to connect comprises a telescoping arm secured at the one end to the back of the central mirror and adapted to be secured at the other end to the windshield.

7. A motor vehicle having a windshield and which includes a rear-view mirror of claim 1 secured to the windshield.

8. A motor vehicle having a windshield and which includes a rear-view mirror of claim 1 wherein the means to connect comprises a telescoping arm secured at the one end to the back of the central mirror and adapted to be secured at the other end to the windshield.

9. A panoramic, rear-view mirror adapted to be mounted on the windshield of a motor vehicle, which mirror provides a one position, relatively continuous, panoramic rear view without distortion of distance perspective, while at the same time keeping the forward view of the highway within peripheral vision, which mirrors comprises in combination:
   (a) mirror housing means which comprises a first and a second wing mirror casing;
   (b) a flat reflecting surface mirror centered between the first and second side mirror casings;
   (c) a first reflecting mirror disposed in the first wing casing and a second reflecting mirror disposed in the second wing casing, the first and second mirrors in the same vertical plane as the center mirror, and the adjacent mirror edges closely adjacent to the respective edges of the central mirror to provide a substantially continuous reflecting mirror view;
   (d) the first and second mirror having a flat surface reflecting area and a gently convexly curved mirror surface area at the exterior peripheral edge which convexed mirror surface area extends a distance of about one inch or less from the flat surface area.
   (e) first adjustment means to secure the first and second casings to the central mirror and to move the first and second casings about a vertical axis with respect to the central mirror;
   (f) second adjustment means to move the first and second mirror within the respective casings about a horizontal axis within the respective casings; and (g) means to connect at a defined distance the central mirror to the windshield of a motor vehicle which means comprises a telescoping arm secured at the one end to the back of the central mirror and adapted to be secured at the other end to the windshield.

10. A motor vehicle having a windshield and which includes a rear-view mirror of claim 9.

* * * * *